(12) United States Patent
Murphy et al.

(10) Patent No.: US 9,501,222 B2
(45) Date of Patent: Nov. 22, 2016

(54) PROTECTION ZONES IN VIRTUALIZED PHYSICAL ADDRESSES FOR RECONFIGURABLE MEMORY SYSTEMS USING A MEMORY ABSTRACTION

(71) Applicant: Micron Technology, Inc., Boise, ID (US)

(72) Inventors: Richard C. Murphy, Boise, ID (US); John Labry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 205 days.

(21) Appl. No.: 14/274,195

(22) Filed: May 9, 2014

(65) Prior Publication Data

US 2015/0324285 A1    Nov. 12, 2015

(51) Int. Cl.
*G06F 12/00*   (2006.01)
*G06F 3/06*    (2006.01)
*G06F 12/02*   (2006.01)

(52) U.S. Cl.
CPC ............... *G06F 3/06* (2013.01); *G06F 3/068* (2013.01); *G06F 3/0626* (2013.01); *G06F 3/0644* (2013.01); *G06F 3/0664* (2013.01); *G06F 12/02* (2013.01); *G06F 12/0292* (2013.01); *G06F 2212/1056* (2013.01); *G06F 2212/151* (2013.01); *G06F 2212/152* (2013.01); *G06F 2212/205* (2013.01); *G06F 2212/651* (2013.01)

(58) Field of Classification Search
CPC ............. G06F 12/0292; G06F 3/0626; G06F 3/0644; G06F 3/0664; G06F 3/068; G06F 2212/151; G06F 2212/152; G06F 2212/1056; G06F 2212/205; G06F 2212/651; G06F 12/1009; G06F 12/10; G06F 12/145; G06F 12/1475; G06F 13/1657; G06F 13/387

USPC ................ 711/203, 206, 209, 170; 710/105; 709/201

See application file for complete search history.

(56) References Cited

U.S. PATENT DOCUMENTS

| | | |
|---|---|---|
| 4,481,573 A | 11/1984 | Fukunaga et al. |
| 4,528,624 A | 7/1985 | Kamionka et al. |
| 5,448,511 A | 9/1995 | Paurus et al. |
| 5,541,914 A | 7/1996 | Krishnamoorthy et al. |
| 5,563,086 A | 10/1996 | Bertin et al. |
| 6,496,847 B1 | 12/2002 | Bugnion et al. |

(Continued)

OTHER PUBLICATIONS

International Search Report for International Application No. PCT/US2015/028882, dated Jul. 27, 2015, 4 pages.

(Continued)

*Primary Examiner* — Hong Kim
(74) *Attorney, Agent, or Firm* — TraskBritt

(57) ABSTRACT

Systems and methods define a memory system using an abstracted memory protocol that enables virtual to physical mapping of memory address requests at an abstracted memory module. A memory abstraction unit abstracts timing and naming of memory requests from one or more clients to timing and naming at one or more memory devices. The memory abstraction unit includes abstracted memory protocol logic for interpreting the memory requests from the one or more clients. The memory abstraction unit also includes mapping logic for translating the naming defined by a memory access request by a requesting client to a virtual physical address at a selected protection zone in at least one of the one or more memory devices and memory control logic for accessing the one or more memory devices at the virtual physical address.

33 Claims, 8 Drawing Sheets

(56) References Cited

U.S. PATENT DOCUMENTS

| | | | |
|---|---|---|---|
| 6,763,328 B1 | 7/2004 | Egolf et al. | |
| 6,871,294 B2 | 3/2005 | Phelps et al. | |
| 7,073,088 B2 | 7/2006 | Jo | |
| 7,239,641 B1 | 7/2007 | Banks et al. | |
| 7,383,374 B2 | 6/2008 | Yamada et al. | |
| 7,565,496 B2 | 7/2009 | Shoham et al. | |
| 7,797,510 B1 | 9/2010 | Case et al. | |
| 7,823,027 B2 | 10/2010 | Itozawa et al. | |
| 8,117,371 B2 | 2/2012 | Jeddeloh | |
| 8,397,013 B1 | 3/2013 | Rosenband et al. | |
| 8,438,328 B2 | 5/2013 | Smith et al. | |
| 8,533,428 B2 | 9/2013 | Bennett et al. | |
| 8,645,665 B1 | 2/2014 | Bennett et al. | |
| 9,092,620 B2 * | 7/2015 | Morinaga | |
| 2006/0153185 A1 | 7/2006 | Jain et al. | |
| 2006/0168419 A1 * | 7/2006 | Gross | G06F 12/1027 711/170 |
| 2007/0283125 A1 * | 12/2007 | Manczak | G06F 11/3466 711/207 |
| 2008/0010417 A1 * | 1/2008 | Zeffer | G06F 12/0808 711/144 |
| 2008/0016269 A1 * | 1/2008 | Chow | G06F 13/1684 711/103 |
| 2008/0022016 A1 * | 1/2008 | Tripathi | G06F 12/1081 709/250 |
| 2008/0155224 A1 * | 6/2008 | Crandall | G06F 12/145 711/203 |
| 2009/0019197 A1 * | 1/2009 | Sekine | G06F 13/28 710/56 |
| 2009/0216921 A1 * | 8/2009 | Saito | G06F 12/1475 710/39 |
| 2009/0327643 A1 | 12/2009 | Goodman et al. | |
| 2010/0228944 A1 * | 9/2010 | Bassett | G06F 12/1027 711/207 |
| 2011/0010483 A1 | 1/2011 | Liljeberg | |
| 2011/0131363 A1 | 6/2011 | Hall et al. | |
| 2011/0173608 A1 | 7/2011 | Buragohain et al. | |
| 2011/0314469 A1 * | 12/2011 | Qian | H04L 49/9057 718/1 |
| 2012/0106228 A1 | 5/2012 | Lee | |
| 2012/0124251 A1 * | 5/2012 | Hnatko | G06F 13/28 710/29 |
| 2013/0007338 A1 | 1/2013 | Karamcheti et al. | |
| 2013/0022201 A1 | 1/2013 | Glew et al. | |
| 2013/0128666 A1 * | 5/2013 | Avila | G06F 11/1048 365/185.11 |
| 2013/0227248 A1 * | 8/2013 | Mehta | G06F 12/1027 711/207 |
| 2014/0013027 A1 | 1/2014 | Jannyavula Venkata et al. | |
| 2014/0013129 A1 | 1/2014 | de Rochemont et al. | |
| 2014/0013132 A1 | 1/2014 | de Rochemont et al. | |
| 2014/0025923 A1 | 1/2014 | Klein | |
| 2014/0064300 A1 * | 3/2014 | Negishi | H04L 49/9005 370/429 |
| 2014/0082234 A1 | 3/2014 | Gopalakrishnan et al. | |
| 2014/0376548 A1 * | 12/2014 | Naven | H04L 49/30 370/389 |
| 2014/0379846 A1 * | 12/2014 | Kanuri | G06F 12/0855 709/216 |
| 2015/0106547 A1 * | 4/2015 | King | H01L 25/00 711/103 |

OTHER PUBLICATIONS

Park et al., "An External Memory Interface for FPGA-Based Computing Engines," Proceedings of 9th Annual IEEE Symposium on Field-Programmable Custom Computing Machines, 2001, pp. 1-2.

Written Opinion for International Application No. PCT/US2015/028882, dated Jul. 27, 2015, 8 pages.

* cited by examiner

PROTECTION ZONES IN VIRTUALIZED PHYSICAL ADDRESSES FOR RECONFIGURABLE MEMORY SYSTEMS USING A MEMORY ABSTRACTION

TECHNICAL FIELD

The present disclosure relates generally to virtual memory mapping. More particularly, the present disclosure relates to virtual memory mapping in reconfigurable memory systems using memory abstraction protocols.

BACKGROUND

Memory devices are typically provided in many data processing systems as semiconductor integrated circuits and/or external removable devices in computers or other electronic devices. There are many different types of memory including Random Access Memory (RAM), Read Only Memory (ROM), Dynamic Random Access Memory (DRAM), Synchronous DRAM (SDRAM), flash memory, and resistance variable memory, among others.

Conventional memory systems typically consist of one or more memory devices, such as DRAMs, mounted on a Printed Circuit Board (PCB) called a Dual In-line Memory Module (DIMM). The memory system is in communication with a memory control subsystem or Central Processing Unit (CPU) or microprocessor. In some configurations, the memory controller is physically subsumed into the same physical chip as the processor. In other configurations the memory controller may be just one of many logical components comprising a Memory Controller Hub (MCH). A memory controller hub typically supports completely separate and distinct memory address spaces, often using different types of semiconductor memory for different purposes. For example, a memory controller may support the use of video DRAM for graphics applications, flash memory for disk-drive acceleration, and commodity DRAM as the processor's main external memory.

Many computer systems are configured to create virtual memory assigned to specific processors, specific processes, and combinations thereof. Current software-based mechanisms for providing machine virtualization (e.g., "hypervisors") provide a relatively insecure mechanism for dividing machine resources among different operating systems. Some hypervisors, most notably those in IBM mainframes, provide hardware enforcement for some of these mechanisms. Even the x86 architecture includes CPU rings for describing the privilege of instructions. Some software hypervisors like VMWARE may be built upon these rings. Some machines may provide hardware "domains" within a single large-scale Symmetric Multiprocessor (SMP) or large-scale distributed systems to allow for multiple instances of the operating system to run on the same hardware platform and provide hardware protection from interference among domains. These types of systems, however, only enable domain-level allocation of resources at the board level. Reconfiguration at the hardware-level is typically coarse-grain (e.g., requiring both processor and memory resources to be allocated together). Reconfiguration at the software level is typically fine-grain, but poorly enforced.

There is currently an industry trend towards "disaggregation" within datacenters, in which processor, memory, and storage resources are allocated in physical units (typically called "sleds") and interconnected via datacenter-scale networks. These resources are accessed at high cost in terms of resources, latency, and throughput via typical network protocols, often TCP/IP. While these types of disaggregated systems enable a somewhat improved balancing of resources in that memory resources do not have to be allocated with processor resources (as was the case prior to disaggregation, adding a new memory controller or disc controller required the addition of another CPU and Operating System (OS) instance), which still incurs high overhead. Network processing alone requires significant firmware and embedded control; complex-protocols impose latency overhead and bandwidth restrictions; etc. Typically, four orders of magnitude in performance or more may be lost in these configurations. In addition, these disaggregated systems represent coarse-grain computer configurations.

DETAILED DESCRIPTION

Figure 1:
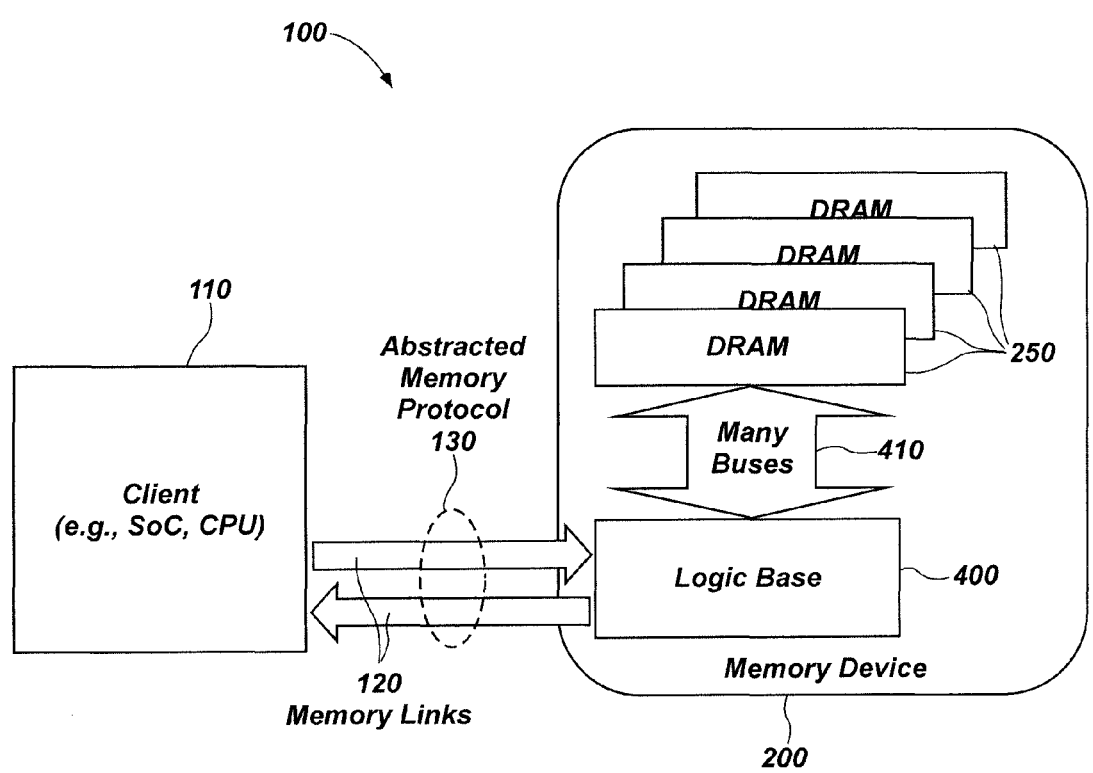
FIG. 1 is a diagram of a data processing system including a hybrid memory cube as an example of a system using an abstracted memory protocol.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

Elements, circuits, modules, and functions may be shown in block diagram form in order not to obscure the present disclosure in unnecessary detail. Moreover, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill would appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

When implemented with hardware, the embodiments disclosed herein may be implemented or performed with a general purpose processor, a special purpose processor, a Digital Signal Processor (DSP), a Processor In Memory (PIM), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. When executing software for carrying out processes for embodiments described herein, a general-purpose processor should be considered a special-purpose processor configured for carrying out such processes. A processor may also be implemented as a combination of computing devices, e.g., a combination of a DSP and a microprocessor, a plurality of microprocessors, one or more microprocessors in conjunction with a DSP core, or any other such configuration.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

Those of ordinary skill in the art will understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus for carrying the signals, wherein the bus may have a variety of bit widths.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," etc., is used for clarity and convenience in understanding the disclosure and accompanying drawings and does not connote or depend on any specific preference, orientation, or order, except where the context clearly indicates otherwise.

It will be understood that when an element is referred to as being "on," "connected to," "coupled to," or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of a number of the associated listed items.

The present disclosure describes methods and apparatus for improving memory subsystems by providing virtualized physical addresses within reconfigurable memory systems using abstracted memory protocols.

The terms "abstracted memory protocol," "abstracted memory," and "memory abstraction" as used herein means a decoupling of timing and naming between a client side request and actual access to a physical memory device. As a non-limiting example of a timing abstraction for a memory read, a client may issue a packetized memory request for a specific address. Sometime later, which may be indeterminate, a memory system supplies the requested data with a packetized memory response. If the memory is DRAM, the timing at the DRAM will include specific row address strobes, column address strobes, and read response times to get the desired data. Thus, the timing of a DRAM is abstracted from the timing of the client's request.

The term "naming" as used herein means a process or data structures for addressing one or more specific locations of a memory. Thus, naming generated by a client may include multiple data structures that combine to point to a specific memory location as viewed by the processor. As a non-limiting example, the client may address a specific location with a device ID number to select a specific device and an address within that device. As another non-limiting example, the client may address a specific location with a zone ID and an address within that zone. Additional details regarding zone IDs and device IDs are discussed below. Naming at a physical memory device points to one or more specific locations of data on that memory device. As a non-limiting example, naming on a DRAM device may include a row address and a column address that combine to address the specific location. Thus, as one specific non-limiting example, a naming abstraction may include a translation (i.e., decoupling) between a device ID and address supplied by a client and a row address and column address at a specific memory device.

With the naming and timing abstractions, embodiments of the present disclosure may be used with a variety of memory and storage devices other than DRAM. As non-limiting examples, RAM devices, flash memory, and storage devices (e.g., disk drives) may also be used.

Embodiments of the present disclosure define "protection zones" within an abstracted memory device and extend the abstracted memory protocol to support the protection zones. Thus, memory systems with the protection zones in abstracted memory devices enable clients (e.g., CPUs) to allocate or deallocate segments of physical memory on a given memory module (e.g., a hybrid memory cube, Processor In Memory (PIM) memory, etc.) via the abstracted protocol. Moreover, the protection zones enable the abstracted memory device to create a virtual physical address in the memory device. In other words, the address presented from the client may be translated to a specific physical address in the abstracted memory device as defined by the protection zone. These protection zones defined at the memory module provide a hardware level virtualization of the memory space rather than a software level virtualization. In addition, the address translation may be distributed throughout the memory system because the address translations are performed at the memory module level rather than in the client or in a memory control hub.

Memory systems according to the present disclosure may be configured using any suitable abstracted memory protocol. To provide specifics, one example of an abstracted memory protocol is defined in detail. This detailed description concentrates on the Hybrid Memory Cube (HMC) protocol as a non-limiting example of an abstracted memory protocol that can support virtual physical addresses defined through protection zones. Then, a more general system is described to show how other abstracted memory protocols and virtual physical addresses can be defined in such general systems.

FIG. 1 is a diagram of a data processing system 100 including a hybrid memory cube device 200 as an example of a device for operation on a memory bus using an abstracted memory protocol 130 to communicate with a client 110. For ease of description, this disclosure focuses on HMC protocol buses. However, as those in the art having the benefit of this disclosure will appreciate, embodiments of the present disclosure may be practiced with other high-speed data buses that include an abstraction between devices holding the data and the protocol on the data bus.

The term "client" 110 is used herein to distinguish devices on a memory bus that are configured mostly as consumers and generators of data, rather than devices for storing data, such as a DRAM memory. As non-limiting examples, clients 110 can be considered processors (also referred to herein as processing devices), such as, for example, general purpose processors, special purpose processors, graphics processors, processors in memory, and digital signal processors. In addition, a client 110 can be considered a process running on a processor, such as, for example, a specific operating system. As another non-limiting example, clients 110 can be considered communication devices. For example, a communication-type client 110 may be configured to convey data between a memory bus and some other type of communication bus, such as, for example, an Input/Output (I/O) bus or a network bus. Of course, clients 110 may also include both processor elements and communication elements. As such, the description herein may also describe a client 110 as a System on a Chip (SoC) 110. Unless specifically stated otherwise, a SoC 110 as referred to herein should be considered equivalent to a client 110. Finally, while clients 110 may be considered to be focused on processing or moving data, they may also contain significant amounts of memory in the form of registers, buffers, caches, and other types of local memory on the client 110.

The hybrid memory cube device 200 (HMC 200) includes a logic base 400, which defines the abstracted memory protocol 130 to create memory links 120 between the client 110 and the HMC 200. A group of parallel buses 410 interface between the logic base 400 and a group of DRAMs 250 on the HMC 200. Additional details of the HMC 200 are discussed below in connection with FIGS. 2 through 4.

The memory links 120 are partitioned into upstream links headed toward the client 110 and downstream links headed away from the client 110. As part of the abstracted memory protocol 130, the memory links 120 are packetized as is explained more fully below. As a result, the memory links 120 are also referred to herein as packetized memory links 120 as well as hybrid memory cube links 120. Moreover, the packets conveyed on the memory links 120 may be referred to as packet requests and packetized requests.

Figure 2:
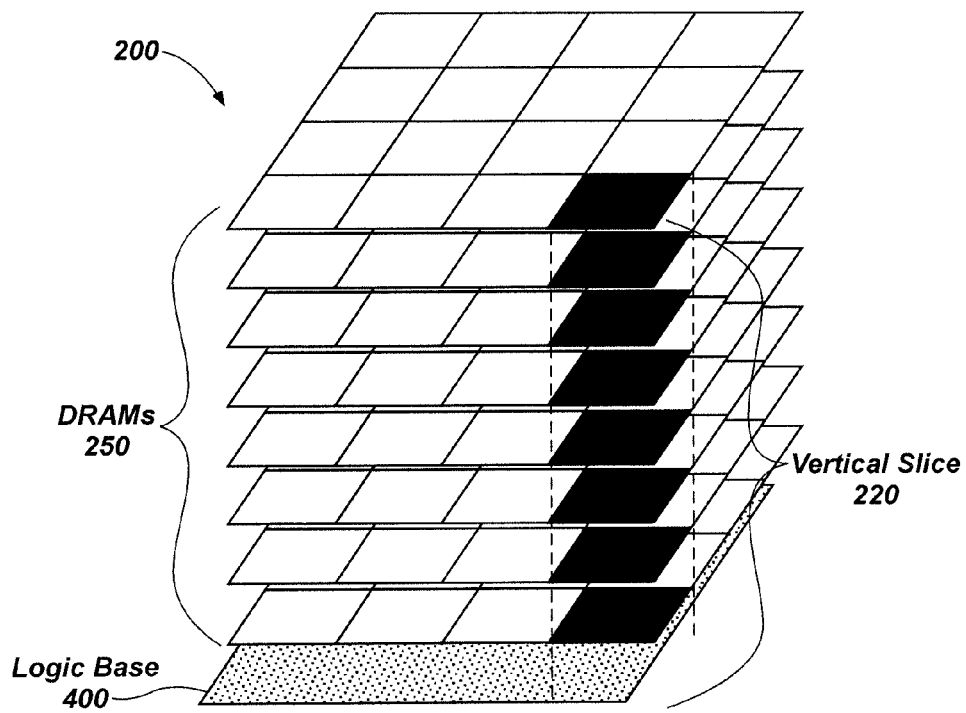
FIG. 2 illustrates possible partitioning of DRAMs in a hybrid memory cube.

FIG. 2 illustrates possible partitioning of DRAMs 250 in the HMC 200. The HMC 200 may be considered as a 3-dimensional stack of DRAM die 250 coupled to the logic base 400. The logic base 400 may be configured as a separate die and configured to interface with the DRAM die 250. When stacked, interconnect between the various die may be accomplished with through silicon vias. While these devices may be physically configured as a 3-dimensional stack, they do not need to be so configured, but can still be thought of as 3-dimensional from an interconnect perspective.

Figure 3:
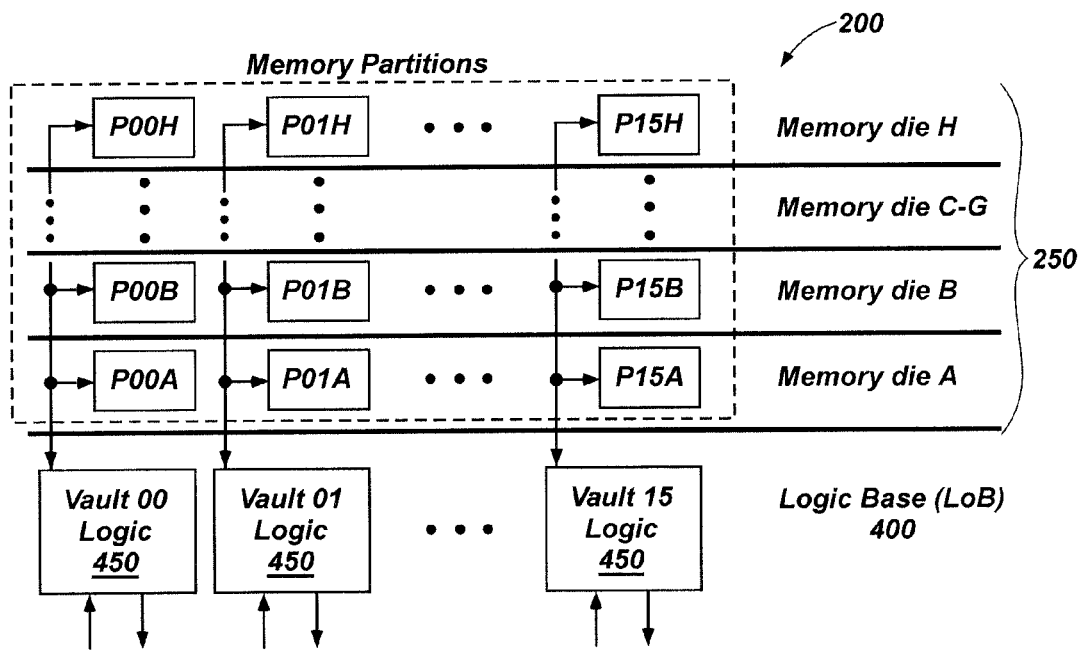
FIG. 3 illustrates a logical view of one example of partitioning of DRAMs in a hybrid memory cube.

FIG. 3 illustrates a logical view of one example of partitioning of DRAMs 250 in an HMC 200. Referring to FIGS. 2 and 3, the interconnection of multiple die layers enables a memory device with a combination of memory storage layers and one or more logic layers. In this manner, the device provides the physical memory storage and logical memory transaction processing in a single die package configured as the HMC 200. The end result is a very compact, power efficient package with available bandwidth capacity of up to 320 GB/s per device.

The HMC 200 is capable of such bandwidth via a hierarchical and parallel approach to the design. For example, device hierarchy may occur vertically across the logic layers and the hardware parallelism may occur across a given die layer. The logic base 400 includes multiple components that provide both external link access to the HMC 200 as well as internal routing and transaction logic.

The HMC 200 may be segmented into vertical slices 220 often referred to as "vaults." Each vault may include vault logic 450 incorporated into the logic base 400 to control segments of the DRAMs 250 associated with that vault. The vault logic 450 manages memory reference operations to memory partitions within its vault. Each vault controller 450 may determine its own timing requirements and refresh operations, which allows different timing for each vault and also eliminates the need for these functions in a host memory controller. In addition, a queue may be included with each vault controller 450 to buffer references for that vault's memory. The vault controllers 450 may execute references within their queue based on need rather than order of arrival. Therefore, responses from vault operations back to the external memory links 120 (FIG. 1) may be out of order in some cases.

The memory links 120 may be configured to provide four or eight logical links. Each memory link 120 may be configured as a group of sixteen or eight serial and bidirectional I/O links. Devices configured with four links have the ability to operate at 10, 12.5 and 15 Gbps. Devices configured with eight links have the ability to operate at 10 Gbps.

Considering the hierarchical nature of the physical memory storage, the HMC device specification defines a different physical addressing and interleave model than traditional banked DRAM devices. Physical addresses for HMC devices 200 are encoded into a 34-bit field that contains the vault, bank, and address bits. The current specification defines four link devices to utilize the lower 32-bits of the field and eight link devices to utilize the lower 33-bits of the field. Rather than relying on a single addressing structure, the specification permits the implementer and user to define an address mapping scheme that is most optimized for the target memory access characteristics. It also provides a series of default address map modes that join the physical vault and bank structure to the desired maximum block request size. The default map schemas implement a low interleave model by mapping the less significant address bits to the vault address, followed immediately by the bank address bits. This method forces sequential addresses to first interleave across vaults then across banks within vaults in order to avoid bank conflicts.

All in-band communication between host devices and HMC devices 200 are performed via a packetized format. This format includes three major packet classifications: request packets, response packets, and flow control packets. Packets may be configured as multiples of a single 16-byte flow unit (also referred to as a FLIT). Packet sizes may be as large as 9 FLITs (i.e., 144 bytes). A smallest packet may include only one 16-byte FLIT including a packet header and packet tail.

Memory read request packets for all memory payload sizes only require the packet header, packet tail, and the respective physical memory address. As such, read requests may be configured using a single FLIT. Memory read responses are separate packets that include the data at the address requested in the corresponding memory read packet. Write request and atomic request packets, however, must also contain the associated input data for write and read-modify-write operations, respectively. As such, these request types may have packet widths of 2-9 FLITs. The HMC device specification defines a weak-ordering model between packets. As such, there may exist multiple packet reordering points present within a target implementation. Arriving packets that are destined for ancillary devices may pass those waiting for local vault access. Local vaults may also reorder queued packets in order to make most efficient use of bandwidth to and from the respective vault banks. However, reordering points present in a given HMC implementation may be defined to maintain the order of a stream of packets from a specific link to a specific bank within a vault. This ordering ensures that memory write requests followed by memory read requests deliver correct and deterministic behavior.

The link structure in the HMC 200 enables chaining of multiple HMCs 200 to enable the construction of memory subsystems that require capacities larger than a single HMC 200 device while maintaining the link structure and packetized transaction protocols. Additional details regarding the chaining are discussed below with reference to FIG. 5.

Figure 4:
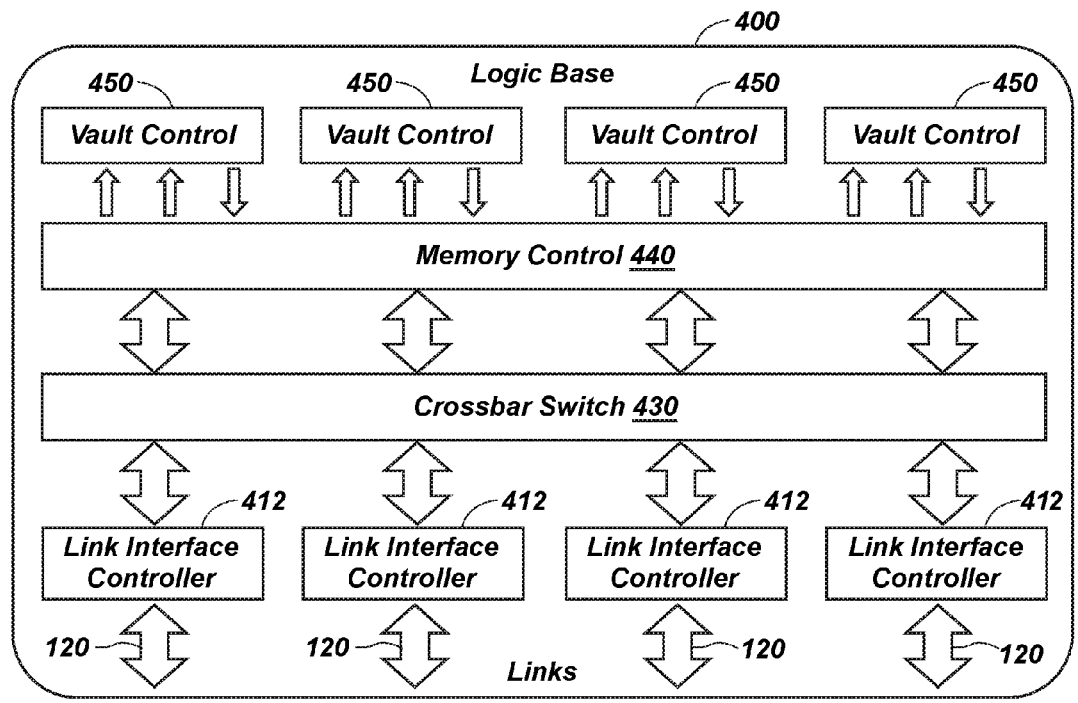
FIG. 4 illustrates a logic base for link interfaces and controlling the DRAMs in a hybrid memory cube.

FIG. 4 illustrates a logic base 400, which may be used for creating the link interfaces 120 and controlling the DRAMs 250 (FIGS. 1 through 3) in an HMC 200. The memory links 120, which include upstream links and downstream links, may be controlled by a link interface controller 412 for each memory link 120. Packets passed through the link interface controllers 412 may be passed through a crossbar switch 430. If a packet is destined for a vault on the HMC 200, the crossbar switch 430 may pass the packet to memory control logic 440. If a packet is destined for another HMC 200, the crossbar switch 430 may pass the packet to an appropriate link interface controller 412 to be sent on to the appropriate HMC 200. The memory control logic 440 and the vault logic 450 for the various vaults may combine to select the appropriate vault and appropriate timing for the selected vault.

Figure 5:
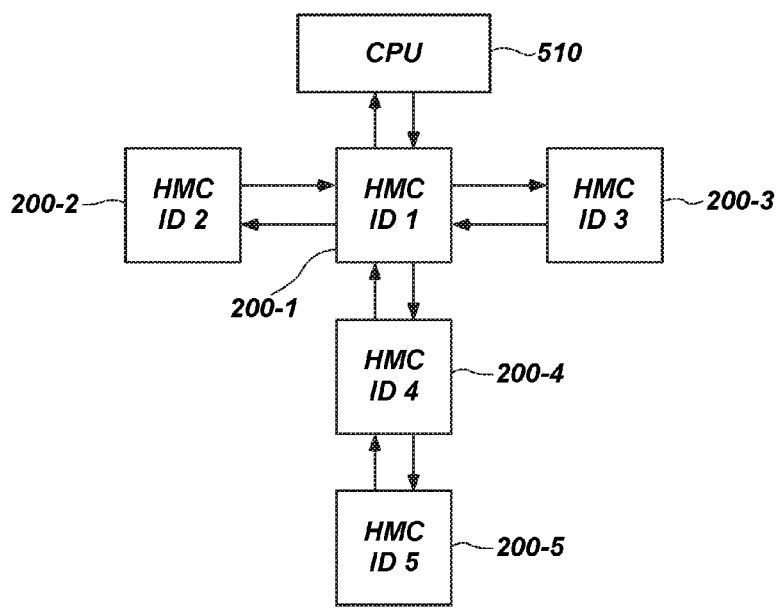
FIG. 5 illustrates chaining of hybrid memory cubes.

FIG. 5 illustrates chaining of hybrid memory cubes (200-0 through 200-5). As stated earlier, multiple HMC devices 200 may be chained together to increase the total memory capacity available to a CPU 510. In an HMC memory system, each HMC 200 is identified through the value in a 3-bit chip ID field in the request packet header. The 3-bit chip ID field may also be referred to herein as a "CUB field" or a "device ID." Thus, a network of up to eight HMC devices 200 may be supported for the CPU 510.

Various topologies for interconnection of HMCs 200 are supported and the routing to different HMCs 200 can be complex and include multiple paths. Thus, a host processor is usually in control of the routing topologies and loads routing configuration information into each HMC 200 to determine how packets that are not for that HMC 200 should be routed to other links on the HMC 200. This routing information enables each HMC 200 to use the CUB field to route request packets to the proper destination. As a result, when an HMC 200 processes a packet that is not destined for itself, the HMC 200 chains and passes the packet through to another link on the HMC 200 to be sent to another HMC 200.

For example, in FIG. 5 if the CPU 510 sends a request packet with a CUB field of 5, the first HMC 200-1 will pass the request packet to the fourth HMC 200-4. The fourth HMC 200-4 will pass the request packet to the fifth HMC 200-5, which services the request packet. Response packets follow the same chain path back to the CPU 510.

Figure 6:
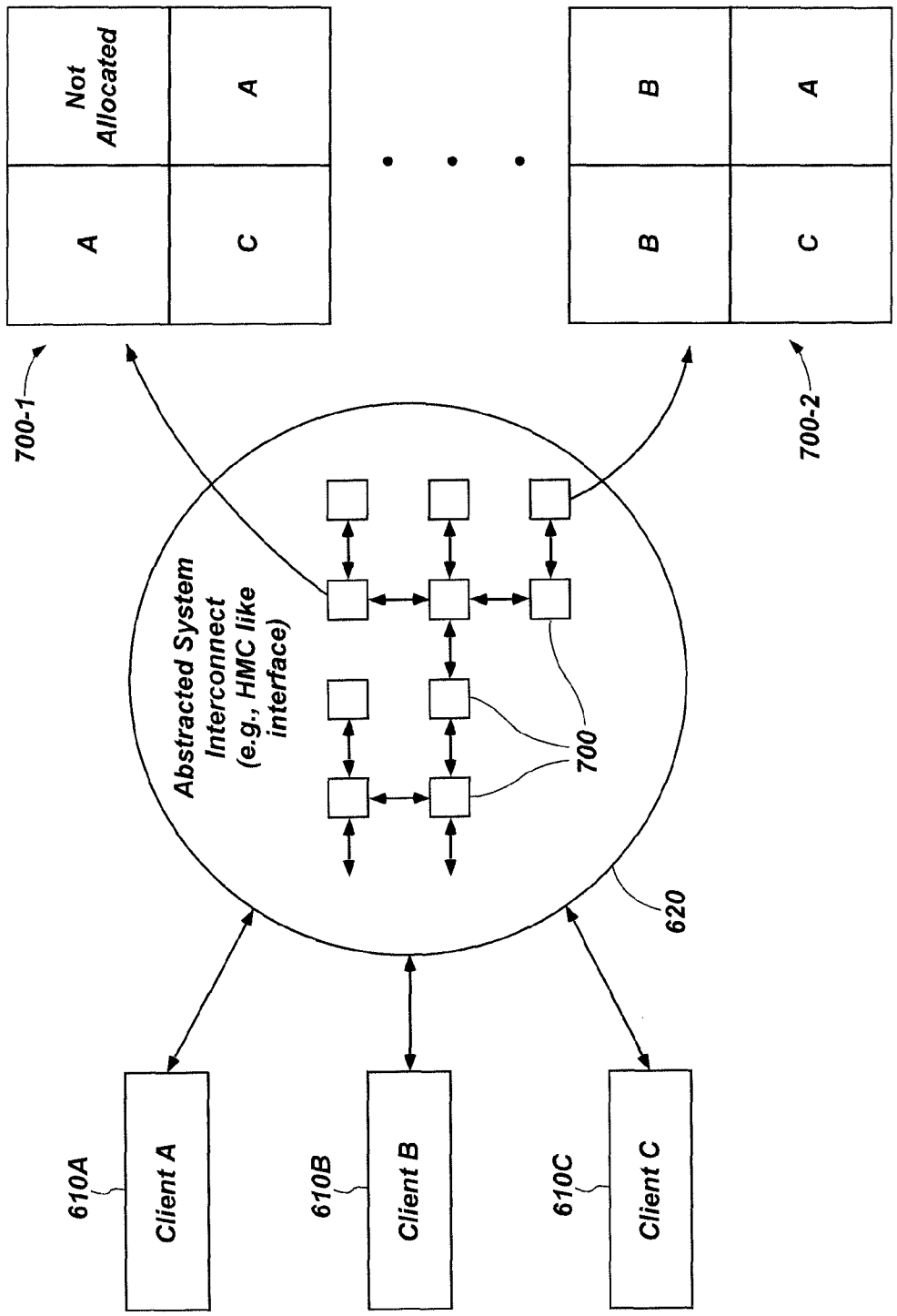
FIG. 6 illustrates a system using abstracted memory protocols and virtual memory allocation at the abstracted memory according to embodiments of the present disclosure.

FIG. 6 illustrates a system using abstracted memory protocols and virtual memory allocation at the abstracted memory according to embodiments of the present disclosure. Multiple clients (610A through 610C) have access to an abstracted memory system interconnect 620. The system interconnect 620 may include any number of abstracted memory modules 700 in many different types of complex topologies. Abstracted memory protocols that use packetized memory requests can generate these complex topologies using the chaining methodologies and device IDs in a manner similar to that of the simpler HMC topology discussed above with reference to FIG. 5. In such a system, a request packet would have a device ID included in it so that all the abstracted memory modules 700 know that the request packet is destined for itself or should be passed on to another abstracted memory module 700 based on chaining directions programmed into the abstracted memory modules 700. Thus, the device ID, along with the address in the request packet can be considered part of the address requested by the clients (610A through 610C).

Each abstracted memory module 700 includes a memory abstraction unit and one or more memory devices. Expanded views are shown for two abstracted memory modules 700-1 and 700-2. As a non-limiting example, these expanded views show four protection zones within the address space of each abstracted memory module (700-1 and 700-2). Of course, many more protection zones may be defined within an abstracted memory module 700, or the abstracted memory module may include a single protection zone.

Examining abstracted memory module 700-2, it can be seen that the two upper protection zones have been allocated to client B 610B. The lower left protection zone has been allocated to client C 610C and the lower right protection zone has been allocated to client A 610A. Examining abstracted memory module 700-1, it can be seen that the upper left and lower right protection zones have been allocated to client A 610A. The lower left protection zone has been allocated to client C 610C and the upper right protection zone has not been allocated.

Figure 7:
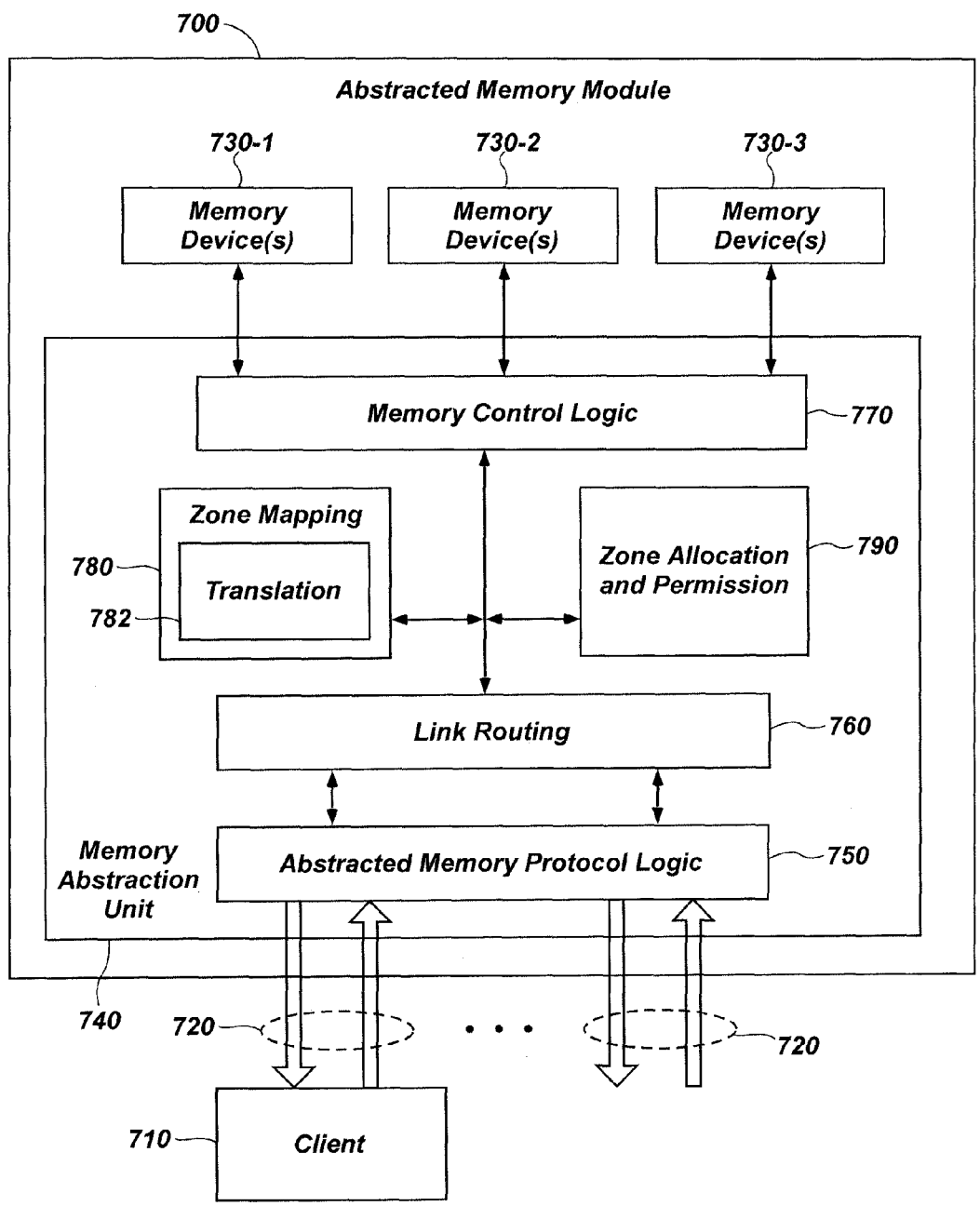
FIG. 7 illustrates a block diagram of a memory abstraction module according to embodiments of the present disclosure.

FIG. 7 illustrates a block diagram of an abstracted memory module 700 according to embodiments of the present disclosure. The abstracted memory module 700 includes a memory abstraction unit 740 and one or more memory devices (730-1 through 730-3). The number of memory devices 730 in the abstracted memory module 700 may vary greatly from as few as one to many dozen, or more. As illustrated, the abstracted memory module 700 includes one or more memory links 720, which may be configured as packetized memory links. If the abstracted memory module 700 is configured to support chaining and packet pass through, (e.g., similar to the HMC protocol), then the abstracted memory module 700 will generally have more than one memory link 720. The memory links 720 may be coupled to clients 710 or other abstracted memory modules 700 to create networks of varying complexities including multiple clients 710 and multiple abstracted memory modules 700.

Abstracted memory protocol logic 750 interprets memory request packets received from the memory links 720 and generates response packets. If there are multiple memory links 720, a link routing module 760 may be included to determine whether received packets are for this particular abstracted memory module 700 or should be forwarded on to another memory link 720 so the memory request can be handled by another abstracted memory module 700.

If the memory request is for the abstracted memory module 700, the request is routed to memory control logic 770, which generates signals for accessing the particular memory devices (730-1 through 730-3) that are to be addressed by the memory request.

Mapping logic 780 is included to create the translation from the address defined by the client 710 in the request packet and the physical addresses in the memory devices (730-1 through 730-3). The mapping logic 780 may be configured in a number of ways to create the actual virtual address to physical address translation.

As one non-limiting example, the translation table 782 may include a page table for taking a portion of the virtual address (e.g., a key derived from some of the upper address bits in the memory request) to create an address into the page table and the page table produces the upper physical address bits for the memory. Thus, the page table produces the base locations of the protection zones. In this scenario, the lower address bits in the memory request would be used to select the appropriate address within the protection zone.

As another non-limiting example, the translation table 782 may be accomplished with registers, such as, for example, a base register to define the base location of the protection zone and a bounds register to define the size of the protection zone. In this scenario, the packet request may include a zone ID, which selects the appropriate base register, which may define the upper address bits of the physical address and an address field with a bit-width that would be defined by the bounds register to address all the memory locations within the protection zone.

In a system using HMC devices, the protection zones may be based on the vaults that are already defined within the HMC device, as explained above. The physical location and size of the vaults are already defined by the HMC device and the vaults only have to be allocated and tied to an allocation requesting client.

Zone permission logic 790 may be included to define which clients 710 have access to any particular zone. The zone permission logic 790 may also be used in combination with mapping logic 780 to allocate the various possible protection zones to various clients 710, as is discussed more fully below.

Allocation of the protection zones may create different types of virtual memory environments for the clients. In some mappings, the virtual address space for the client 710 may appear contiguous with no holes between the base of the address space and the top of the address space. In other mappings, the virtual address space for the client 710 may appear discontiguous (i.e., fragmented). In this fragmented configuration the client 710 may know to only address the various zone IDs that have been allocated to it and addresses within that zone.

In summary, in some embodiments, an apparatus includes a memory abstraction unit for abstracting timing and naming of memory requests from one or more clients to timing and naming at one or more memory devices. The memory abstraction unit includes abstracted memory protocol logic for interpreting the memory requests from the one or more clients. The memory abstraction unit also includes mapping logic for translating the naming defined by a memory access request by a requesting client to a virtual physical address at a selected protection zone in at least one of the one or more memory devices. The memory abstraction unit also includes memory control logic for accessing the one or more memory devices at the virtual physical address. Also, in the apparatus the selected protection zone has been previously defined and allocated to the requesting client by the memory abstraction unit.

In other embodiments, a hybrid memory cube includes a plurality of memory devices and a logic base. The logic base includes one or more link interface controllers configured to interpret a packetized memory request and mapping logic configured to translate an address provided in the packetized memory request to a virtual physical address on one or more of the plurality of memory devices, the virtual physical address belonging to a predefined protection zone. The logic base also includes memory control logic configured to access the one or more of the plurality of memory devices with the virtual physical address.

In other embodiments, a system includes one or more clients and one or more abstracted memory modules. Each abstracted memory module includes one or more memory devices and abstracted memory protocol logic. The abstracted memory protocol logic is for interpreting memory requests from the one or more clients and servicing the memory requests that are destined to the one or more memory devices associated with the abstracted memory module. The abstracted memory protocol logic is also for passing the memory requests that are not destined to the abstracted memory module to another abstracted memory module. Each abstracted memory module also includes mapping logic for translating an address defined by a memory access request by a requesting client to a virtual physical address at a selected protection zone in at least one of the one or more memory devices. Each abstracted memory module also includes memory control logic for accessing the at least one of the one or more memory devices at the virtual physical address.

Figure 8:
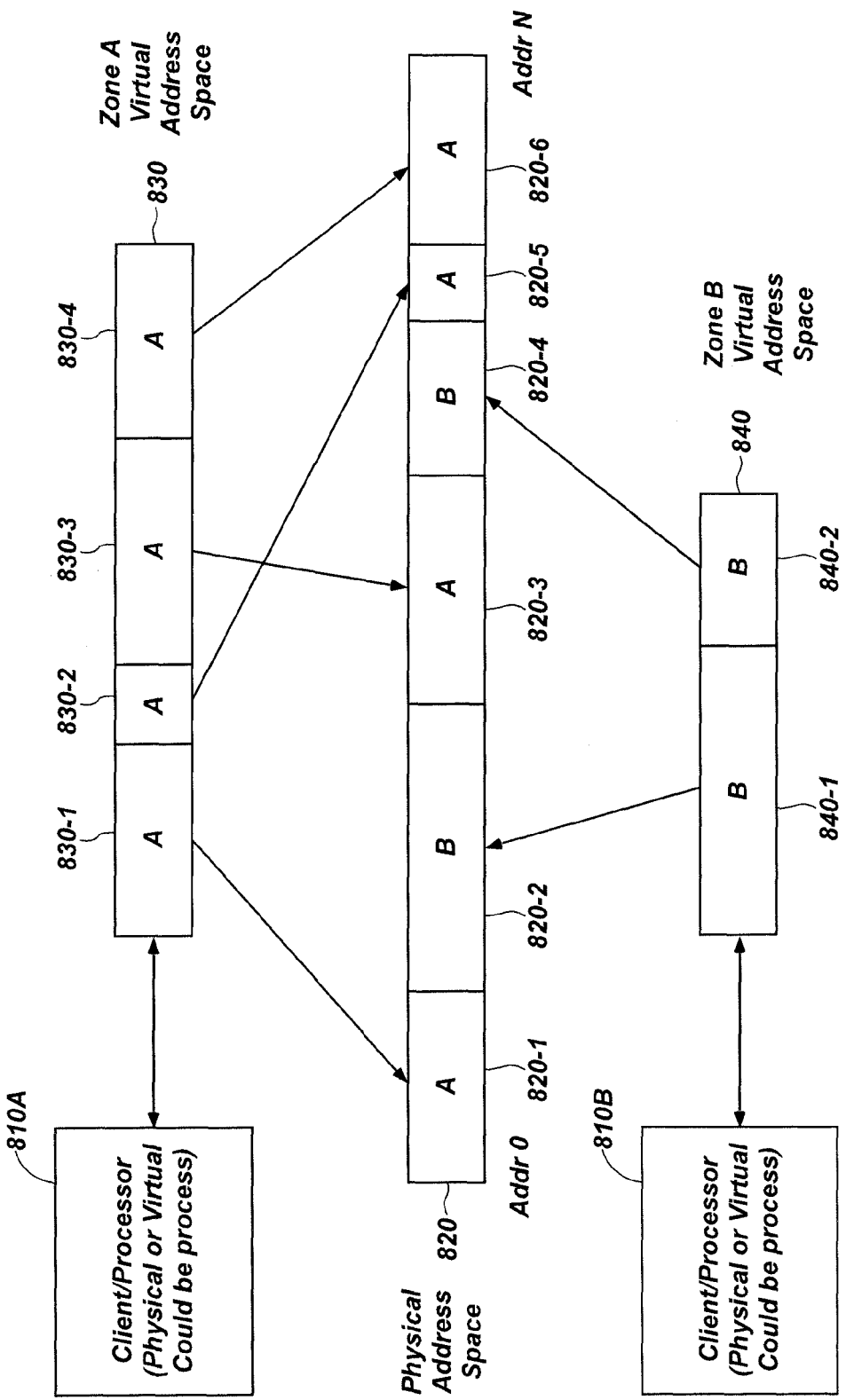
FIG. 8 illustrates a memory diagram showing a physical address space and virtual address spaces that are allocated contiguously.

FIG. 8 illustrates a memory diagram showing a physical address space 820 and virtual address spaces (830 and 840) that are allocated contiguously. In this highly virtualized mapping, the virtual address spaces (830 and 840) generally begin at zero and extend contiguously up to the maximum address based on how many protection zones have been allocated. As more zones are allocated, they are generally appended on to the top of the address space. As a non-limiting example, this kind of mapping can be useful in virtual software machines. For example, when multiple operating systems are running on a single client, operating systems may expect certain software elements to appear at specific addresses. Thus, the operating system executing in a virtual software environment can have virtual addresses that begin at zero and build contiguously.

FIG. 8 illustrates a first client 810A and a second client 810B. Both clients (810A and 810B) are accessing the same physical memory 820. The physical memory 820 is segmented into physical protection zones (820-1 through 820-6) of varying sizes. The first client 810A has been allocated four virtual protection zones (830-1 through 830-4) to create the contiguous virtual memory space 830. Referring also to FIG. 7, the mapping logic 780 in one or more abstracted memory modules 700 has mapped virtual protection zone 830-1 to physical protection zone 820-1. Similarly, virtual protection zone 830-2 is mapped to physical protection zone 820-5, virtual protection zone 830-3 is mapped to physical protection zone 820-3, and virtual protection zone 830-4 is mapped to physical protection zone 820-6.

The second client 810B has been allocated two virtual protection zones (840-1 and 840-2) to create the contiguous virtual memory space 840. Referring also to FIG. 7, the mapping logic 780 in one or more abstracted memory modules 700 has mapped virtual protection zone 840-1 to physical protection zone 820-2. Similarly, virtual protection zone 840-2 is mapped to physical protection zone 820-4.

Of course, in complex systems the physical address space may be much larger and may include hundreds of protection zones. In addition, complex systems may include many clients with very large virtual address spaces.

Thus, a memory system includes a plurality of memory devices defining a physical memory address space and one or more virtual memory address spaces. Each virtual memory address space includes a plurality of virtual protection zones to form a contiguous virtual address space, wherein each virtual protection zone is mapped to a physical protection zone in the physical memory address space by an abstracted memory module configured to communicate with an abstracted memory protocol.

Figure 9:
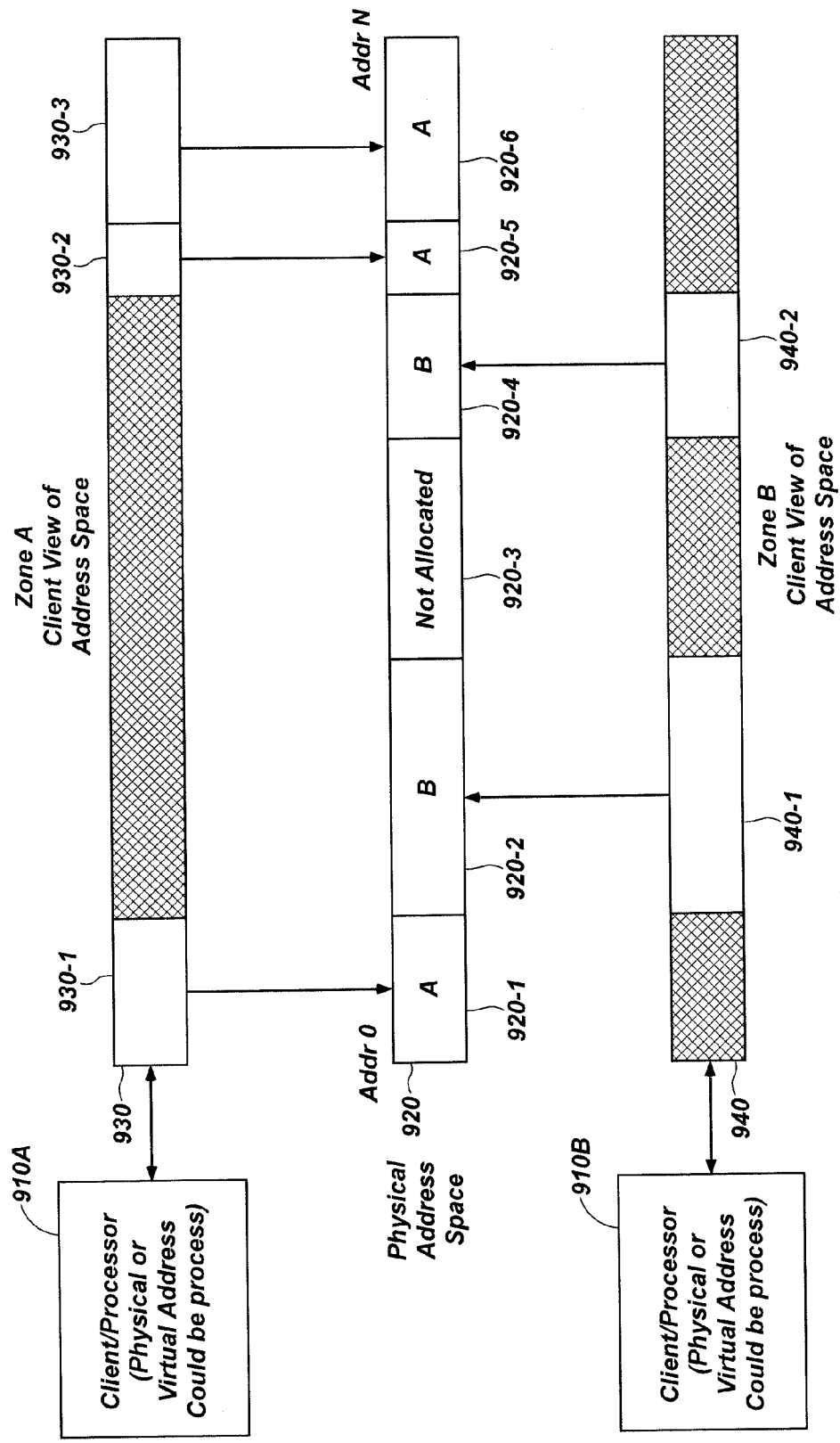
FIG. 9 illustrates a memory diagram showing a physical address space and virtual address spaces that may be allocated non-contiguously.

FIG. 9 illustrates a memory diagram showing a physical address space 920 and virtual address spaces (930 and 940) that may be allocated non-contiguously (i.e., fragmented). In systems with very large address spaces (e.g., 64-bit address systems) and with processors and/or virtual clients that can operate in highly segmented address spaces, there may be no need to perform an address translation. In such systems, the virtual address space (930 and 940) the client sees may appear fragmented. However, the protection zones may still be allocated and protected as with the embodiment in FIG. 8, but there is no need for an address translation. The embodiment of FIG. 9 may potentially provide for additional security as many security exploits (and program bugs) can be created from overrunning one segment of the address space into another. The "holes" naturally created by multiple clients allocating segments from different memory parts would cause exceptions if the client tried to access a protection zone that wasn't allocated to it.

FIG. 9 illustrates a first client 910A and a second client 910B. Both clients (910A and 910B) are accessing the same physical memory 920. The physical memory 920 is segmented into physical protection zones (920-1 through 920-6) of varying sizes. The first client 910A has been allocated three virtual protection zones (930-1 through 930-3) to create the fragmented virtual memory space 930. Referring also to FIG. 7, the mapping logic 780 in one or more abstracted memory modules 700 has mapped virtual protection zone 930-1 to physical protection zone 920-1. Similarly, virtual protection zone 930-2 is mapped to physical protection zone 920-5, and virtual protection zone 930-3 is mapped to physical protection zone 920-6.

The second client 910B has been allocated two protection zones (940-1 and 940-2) to create the fragmented virtual memory space 940. Referring also to FIG. 7, the mapping logic 780 in one or more abstracted memory modules 700 has mapped virtual protection zone 940-1 to physical protection zone 920-2. Similarly, virtual protection zone 940-2 is mapped to physical protection zone 920-4. Physical protection zone 920-3 is an available protection zone as it has not yet been allocated to a client.

Of course, in complex systems the physical address space may be much larger and may include hundreds of protection zones. In addition, complex systems may include many clients with very large virtual address spaces.

Thus, a memory system includes a plurality of memory devices defining a physical memory address space and one or more virtual memory address spaces. Each virtual memory address space includes a plurality of virtual protection zones to form a fragmented virtual address space, wherein each virtual protection zone is mapped to a physical protection zone in the physical memory address space by an abstracted memory module configured to communicate with an abstracted memory protocol.

Figure 10:
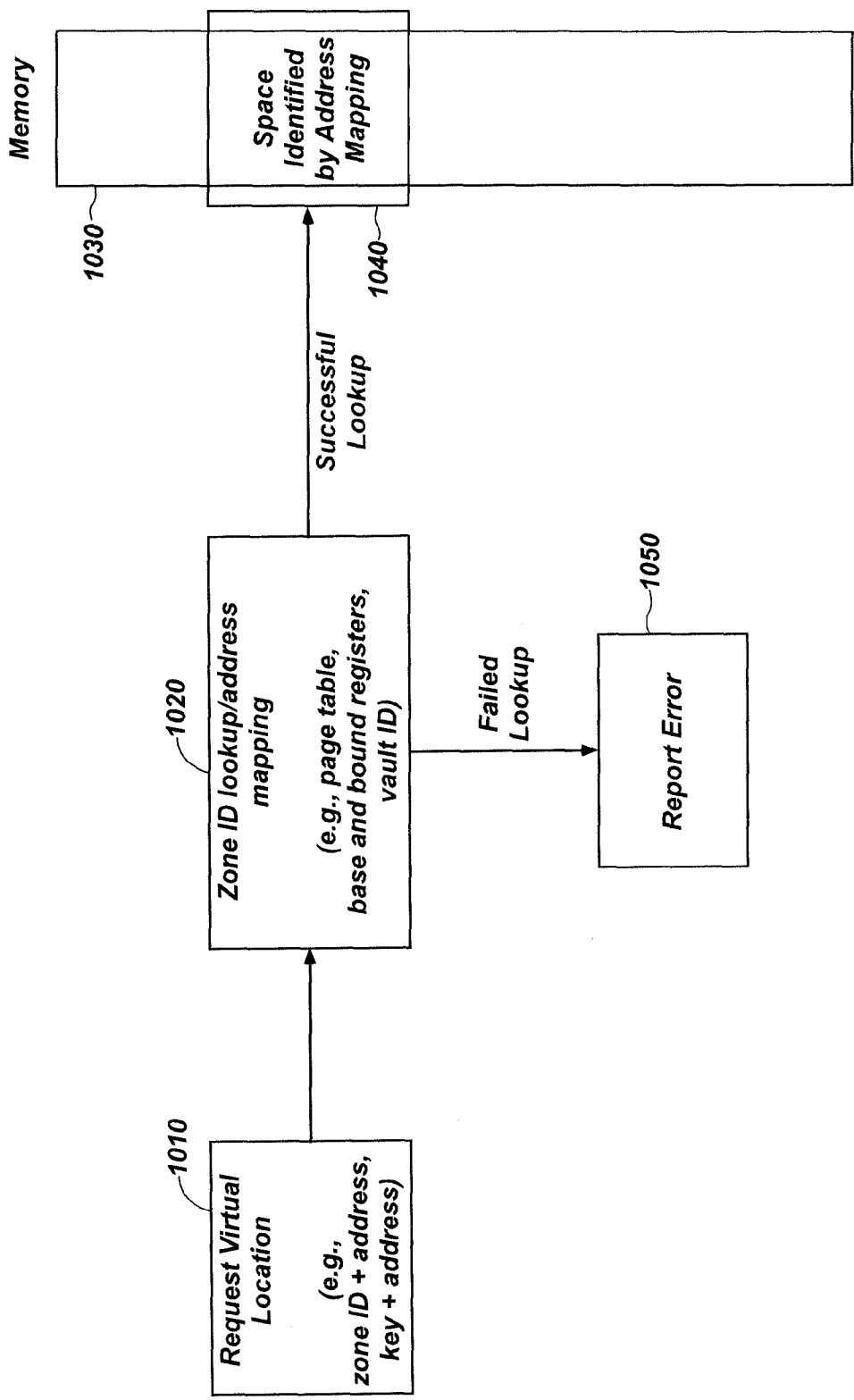
FIG. 10 illustrates a process of accessing a virtual address space using an abstracted memory protocol.

FIG. 10 illustrates a process of accessing a virtual address space using protection zones in an abstracted memory protocol. At operation 1010 a client requests a virtual location. As a non-limiting example, this request may be a name defined by a device ID to select the proper abstracted memory module 700 (FIG. 7), a zone ID to define a selected protection zone on the abstracted memory module 700, and an address within the protection zone. At operation 1020, the mapping logic 780 (FIG. 7) on the appropriate abstracted memory module 700 translates the name in the request to a physical address location. In addition, the request may include a client ID indicating which client generated the request and the zone permission logic 790 (FIG. 7) may verify that the client has permission to access the physical protected zone. If the lookup fails or the client does not have permission, operation block 1050 indicates an error is reported back to the requesting client. If the lookup is successful and the client has permission, the physical protection zone 1040 in the physical memory address space 1030 can be accessed.

The protection zones may be allocated in a number of different ways. As a non-limiting example, a client can send a request to allocate a protection zone to a specific abstracted memory module 700 (FIG. 7). In some embodiments, the client may also request a specific size for the requested protection zone. In other embodiments, a size may not be requested and the abstracted memory module 700 may define the size of the protection zone. If the abstracted memory module 700 has a protection zone available, it can allocate the protection zone to the requesting client and report the allocation back to the client with a zone ID. In some embodiments, the abstracted memory module 700 may keep track of the requesting client with a client ID so it can verify subsequent accesses to that protection zone are from a client with permission to access that protection zone. In this way, multiple clients can be given access to the same protection zone and each client can have a different virtual to physical address translation.

Alternatively, rather than the client requesting a protection zone from a specific abstracted memory module 700, the client may send out a general allocation request. This general allocation request could then follow a chaining algorithm through the network of abstracted memory modules 700 to find the first module with a free protection zone to allocate.

In another allocation process, the client could read a public table in the abstracted memory module 700 to determine whether or not the module has free space for a protection zone (e.g., either a fixed number of variable size segments or a fixed number of page-like structures). The client could also query the abstracted memory module 700 as part of the protocol. For example, the client could send a request that says something like "allocate X GBytes for me," which either succeeds or fails. Alternatively, the client could split the query into two queries like "do you have X GBytes?", if the answer is yes, the client could follow up with a request to give that protection zone of X GBytes to that client.

In response to a successful allocation request, the abstracted memory module 700 may generate a response packet that says something like, "this block of memory now belongs to zone A with addresses X-Y" where A is the key or zone ID and X-Y describes the new physical memory addresses.

The zone permission logic 790 (FIG. 7) may include other permission fields (e.g., read access or write access), which can be enabled on a per-segment/per-ID basis to enable shared databases.

Each client is aware of which protection zones have been allocated to it. If the client no longer needs the protection zone, it can send a deallocation request. The abstracted memory module 700 can accept the deallocation request and remove the allocated protection zone from the mapping logic.

Thus, a method of accessing memory includes generating a memory access request with an abstracted memory protocol and accepting the memory access request at an abstracted memory module. The method also includes translating a naming defined by the memory access request to a virtual physical address at a selected protection zone in one or more memory devices associated with the abstracted memory module and accessing the one or more memory devices at the virtual physical address.

The embodiments of the disclosure described above and illustrated in the accompanying drawing figures do not limit the scope of the invention, since these embodiments are merely examples of embodiments of the disclosure. The invention is defined by the appended claims and their legal equivalents. Any equivalent embodiments lie within the scope of this disclosure. Indeed, various modifications of the present disclosure, in addition to those shown and described herein, such as alternative useful combinations of the elements described, will become apparent to those of ordinary skill in the art from the description. Such modifications and embodiments also fall within the scope of the appended claims and their legal equivalents.

What is claimed is:

1. An apparatus, comprising:
   a memory abstraction unit configured for abstracting naming of memory access requests from one or more clients to naming at one or more memory devices, the memory abstraction unit comprising:
   abstracted memory protocol logic for interpreting the memory requests from the one or more clients;
   mapping logic for translating an address defined by the naming of the memory access request by a requesting client of the one or more clients to a virtual physical address at a selected protection zone in at least one of the one or more memory devices; and
   memory control logic for accessing the one or more memory devices at the virtual physical address;
   wherein the selected protection zone has been previously defined and allocated to the requesting client by the memory abstraction unit.

2. The apparatus of claim 1, wherein the memory abstraction unit further comprises zone permission logic in the memory abstraction unit configured to allow the memory access request to complete when the requesting client has permission to access the selected protection zone and configured to report an error when the requesting client does not have permission to access the selected protection zone.

3. The apparatus of claim 2, wherein the zone permission logic is further configured to grant permission to access the selected protection zone responsive to whether the memory access request is a read access or a write access.

4. The apparatus of claim 1, wherein the memory abstraction unit further comprises zone permission logic in the memory abstraction unit configured to allow the memory access request to complete when an address provided in the memory access request is in the selected protection zone and configured to report an error when the address provided in the memory access request is not in any defined protection zones.

5. The apparatus of claim 1, wherein the mapping logic is further configured for:
   accepting an allocation request from an allocation requesting client of the one or more clients;
   determining an available protection zone in a memory device of the one or more memory devices;
   allocating the available protection zone to the allocation requesting client; and
   reporting a location of the allocated protection zone to the allocation requesting client.

6. The apparatus of claim 5, wherein the mapping logic is further configured for:
   accepting a deallocation request from the allocation requesting client; and
   removing the allocated protection zone from the mapping logic.

7. The apparatus of claim 5, wherein accepting the allocation request from the allocation requesting client includes accepting a requested size and allocating the available protection zone includes allocating the available protection zone at the requested size.

8. The apparatus of claim 1, wherein the abstracted memory protocol logic is configured for interpreting memory accesses using a hybrid memory cube protocol.

9. The apparatus of claim 8, wherein the protection zones are configured as vaults in a hybrid memory cube.

10. The apparatus of claim 1, wherein the mapping logic includes an address translation table for converting the naming from the requesting client to the naming for a memory device of the one or more memory devices to be accessed.

11. The apparatus of claim 1, wherein the mapping logic includes a base register and a boundary register to define a location and size of each allocated protection zone in a memory.

12. The apparatus of claim 1, wherein the memory access request includes a client ID for the requesting client and the memory control logic does not access the virtual physical address if the client ID does not have permission for the selected protection zone.

13. The apparatus of claim 1, wherein the address defined by the memory access request includes a zone ID and an address within the selected protection zone and the mapping logic generates at least a portion of the virtual physical address responsive to the zone ID.

14. A hybrid memory cube, comprising:
   a plurality of memory devices;
   a logic base comprising:
      one or more link interface controllers configured to interpret a packetized memory request;
      mapping logic configured to translate an address provided in the packetized memory request to a virtual physical address on one or more of the plurality of memory devices, the virtual physical address belonging to a predefined protection zone; and
      memory control logic configured to access the one or more of the plurality of memory devices with the virtual physical address.

15. The hybrid memory cube of claim 14, wherein the logic base further comprises zone permission logic configured to allow the packetized memory request to complete when the address provided in the packetized memory request is in the predefined protection zone and configured to report an error when the address provided in the packetized memory request is not in any defined protection zones.

16. The hybrid memory cube of claim 14, wherein the predefined protection zone is configured as a vault in the hybrid memory cube.

17. The hybrid memory cube of claim 14, wherein the mapping logic is further configured for:
   accepting an allocation request from an allocation requesting client;
   determining an available protection zone in one or more memory devices of the plurality of memory devices;
   allocating the available protection zone to the allocation requesting client; and
   reporting a location of the allocated protection zone to the allocation requesting client.

18. The hybrid memory cube of claim 17, wherein the mapping logic is further configured for:
   accepting a deallocation request from the allocation requesting client; and
   removing the allocated protection zone from the mapping logic.

19. The hybrid memory cube of claim 17, wherein accepting the allocation request from the allocation requesting client includes accepting a requested size and wherein allocating the available protection zone includes allocating the available protection zone at the requested size.

20. A system, comprising:
   one or more abstracted memory modules, each abstracted memory module comprising:
      one or more memory devices;
      abstracted memory protocol logic for:
         interpreting memory requests from one or more clients;
         servicing the memory requests that are destined to the one or more memory devices associated with the abstracted memory module; and
         passing the memory requests that are not destined to the abstracted memory module to another abstracted memory module;
      mapping logic for translating an address defined by a memory access request by a requesting client of the one or more clients to a virtual physical address at a selected protection zone in at least one of the one or more memory devices; and
      memory control logic for accessing the at least one of the one or more memory devices at the virtual physical address.

21. The system of claim 20, wherein each of the one or more abstracted memory modules further comprises a module ID and memory requests include a module ID identifying which abstracted memory module of the one or more memory modules is to use the address.

22. The system of claim 20, wherein the address defined by the memory access request includes a zone ID and an address within the selected protection zone and the mapping logic generates at least a portion of the virtual physical address responsive to the zone ID.

23. The system of claim 20, wherein the one or more abstracted memory modules comprise hybrid memory cubes.

24. A memory system, comprising:
   a plurality of memory devices defining a physical memory address space including a plurality of physical protection zones; and
   one or more virtual memory address spaces, each virtual memory address space comprising a plurality of virtual protection zones to form a contiguous virtual address space, wherein each virtual protection zone is mapped to a corresponding physical protection zone of the plurality of physical protection zones in the physical memory address space by an abstracted memory module configured to communicate with an abstracted memory protocol and control access to the plurality of physical protection zones.

25. The memory system of claim 24, wherein the physical protection zone is only accessible by a requesting client that has been given permission to access the selected protection zone by the abstracted memory module.

26. The memory system of claim 24, wherein at least one physical protection zone is mapped to a virtual protection zone in at least two of the two or more virtual memory address spaces.

27. A memory system, comprising:
   a plurality of memory devices defining a physical memory address space including a plurality of physical protection zones; and
   one or more virtual memory address spaces, each virtual memory address space comprising a plurality of virtual protection zones to form a fragmented virtual address space, wherein each virtual protection zone is mapped to a corresponding physical protection zone of the plurality of physical protection zones in the physical memory address space by an abstracted memory module configured to communicate with an abstracted memory protocol and control access to the plurality of physical protection zones.

28. The memory system of claim 27, wherein the physical protection zone is only accessible by a requesting client that has been given permission to access the selected protection zone by the abstracted memory module.

29. The memory system of claim 27, wherein at least one physical protection zone is mapped to a virtual protection zone in at least two of the two or more virtual memory address spaces.

30. A method of accessing memory, comprising:
   generating a memory access request with an abstracted memory protocol;
   accepting the memory access request at an abstracted memory module;
   translating a naming including an address defined by the memory access request to a virtual physical address at a selected protection zone in one or more memory devices associated with the abstracted memory module; and
   accessing the one or more memory devices at the virtual physical address.

31. The method of claim 30, further comprising allowing the memory access request to complete when a requesting client that generated the memory request has permission to access the selected protection zone and reporting an error when the requesting client does not have permission to access the selected protection zone.

32. The method of claim 30, further comprising granting permission to access the selected protection zone responsive to whether the memory access request is a read access or a write access.

33. The method of claim 30, further comprising allowing the memory access request to complete when the address provided in the memory access request is in the selected protection zone and reporting an error when the address provided in the memory access request is not in any defined protection zones.

* * * * *